United States Patent [19]
Jackson et al.

[11] Patent Number: 5,299,275
[45] Date of Patent: Mar. 29, 1994

[54] OPTICAL FIBER FILTER FOR REDUCING ARTIFACTS IN IMAGING APPARATUS

[75] Inventors: Todd A. Jackson, Pittsford; Robert H. Hibbard, Fairport, both of N.Y.

[73] Assignee: Eastman Kodak Company, Rochester, N.Y.

[21] Appl. No.: 40,713

[22] Filed: Mar. 31, 1993

[51] Int. Cl.$^5$ .......................... G02B 6/04; G02B 6/06; G02B 6/42

[52] U.S. Cl. ........................ 385/116; 385/89; 385/117; 385/120; 358/901.1

[58] Field of Search ................. 385/31, 89, 92, 94, 385/115, 116, 117, 120, 907; 128/4–6; 359/554

[56] References Cited

U.S. PATENT DOCUMENTS

| | | | |
|---|---|---|---|
| 4,101,929 | 7/1978 | Ohneda et al. | 358/44 |
| 4,185,888 | 1/1980 | Quelle | 350/96.25 |
| 4,408,230 | 10/1983 | Tamura et al. | 358/213 |
| 4,518,864 | 5/1985 | Inuiya | 250/578 |
| 4,574,317 | 3/1986 | Scheible | 358/285 |
| 4,674,834 | 6/1987 | Margolin | 350/96.25 |
| 4,675,727 | 6/1987 | Sekizawa et al. | 358/75 |
| 4,676,593 | 6/1987 | Adachi et al. | 385/117 |
| 4,760,421 | 7/1988 | Margolin | 355/1 |
| 4,760,839 | 8/1988 | Nagasaki | 128/6 |
| 4,762,391 | 8/1988 | Margolin | 350/96.25 |
| 4,815,816 | 3/1989 | Schneider | 350/96.25 |
| 4,896,217 | 1/1990 | Miyazawa et al. | 358/213.11 |
| 4,930,861 | 6/1990 | Okabe et al. | 385/117 |
| 4,977,450 | 12/1990 | Yokota | 358/98 |
| 4,978,195 | 12/1990 | Takano et al. | 350/96.27 |
| 4,988,171 | 1/1991 | Yokota | 359/498 |
| 4,989,959 | 2/1991 | Plummer | 359/737 |
| 4,998,800 | 3/1991 | Nishida et al. | 350/162.2 |
| 5,029,010 | 7/1991 | Shiraishi | 358/225 |
| 5,061,036 | 10/1991 | Gordon | 385/116 |
| 5,077,821 | 12/1991 | Makel et al. | 385/120 |

Primary Examiner—Frank Gonzalez
Attorney, Agent, or Firm—David M. Woods

[57] ABSTRACT

An optical fiber array is used as a blur filter in imaging apparatus to limit high spatial frequencies incident upon an image sensor, and thereby to reduce undersampling artifacts. The optical fiber array is disposed in the path of incident image light a predetermined distance from the image sensor such that at least some of the optical fibers composing the array emit a cone of light over adjacent photosites, thereby producing a blurred image. The blurring effect can also be obtained by using a pseudo-random array of fibers, and the imaging assembly can be additionally simplified by using the fiber optic array as a protective cover plate for the sensor.

18 Claims, 4 Drawing Sheets

OPTICAL FIBER FILTER FOR REDUCING ARTIFACTS IN IMAGING APPARATUS

FIELD OF INVENTION

The present invention pertains to an optical low-pass filter used in the optical path of an electronic imaging system to reduce aliasing, or undersampling, effects.

BACKGROUND OF THE INVENTION

An electronic imaging system typically produces a signal output corresponding to a viewed object by spatially sampling an image of the object in a regular pattern with an array of photosensitive elements, such as, for example, with a charge-coupled device (CCD) solid-state image sensor. In such an imaging system, it is well-known that detail components in the object which contain frequencies too high to be analyzed within the sampling interval of the sensor contribute to the amplitudes of lower frequency components, and thereby produce imaging errors commonly referred to as aliasing or undersampling artifacts. In particular, if spatial detail being imaged contains a high frequency component of a periodicity smaller than the pitch (periodicity) of each neighboring photosensitive picture element of the solid state image sensor, the subsequent detection of this high frequency component tends to result in a spurious signal due to aliasing.

In general, the electronic imaging system can minimize aliasing if its optical section has a frequency response that cuts off, or filters out, the higher frequency content of the object. As a result, the optical section generally employs an optical low pass filter to substantially reduce the high frequency component contained in the spatial detail of the image received by the image sensor. It is thus well-known in the prior art that the design of electronic imaging systems involves a trade-off between image sharpness and the susceptibility of the imaging system to aliasing distortions or undersampling artifacts.

To limit these artifacts, an optical filter such as, for example, a birefringent blur filter has become a common component in consumer color video cameras. U.S. Pat. Nos. 4,101,929 and 4,896,217 show typical examples of such filters. Such a filter is typically placed between a lens and the image sensor to provide a low-pass filter function which reduces the spatial frequency content of the object at frequencies above the Nyquist frequency of the photosensitive elements. This makes the imaging system less susceptible to aliasing distortion. For example, for many available sensors wherein equal pixel densities in each of the sensed colors provide that each of the sensed colors have the same Nyquist frequency, an achromatic low-pass, or "blur", function is effective in minimizing aliasing distortion. Such a function can readily be provided by a birefringent filter.

The birefringement blur filter is typically composed of filter plates manufactured from a crystalline material like quartz that exhibits a dual refraction effect when the crystal axes of the filter plates are oriented at an angle with respect to the plate surface. In this orientation, a randomly polarized ray of light passing through such a filter plate emerges as two separated polarized rays. The combination of several such plates produces a multiple spot pattern from each incident point in the image. If this spot pattern distributes light energy over multiple photosensitive elements, then the effect of a blur is obtained. This will limit the optical transfer function of the system at spatial frequencies above the Nyquist frequency of the photosensitive elements. However, this type of filter suffers from the drawback that it is costly and complicated to manufacture. In addition, a practical birefringent filter tends to be rather large and thick. Indeed, the thickness required to achieve the desired blur requires a lens with a long back focal length in order to make room for the blur filter in the optical path. Space limitations often do not allow such an optical structure, and lens design becomes unduly complicated. Finally, since such a filter requires randomly polarized, or non-polarized, light, a polarizing filter cannot be allowed in such a system to obtain well known photographic polarizing effects.

It is also well known in the art to use a phase diffraction grating as a frequency selective filter to produce an image blur. For example, as shown in U.S. Pat. No. 4,998,800, the periodicity of an image of a diffraction grating projected onto a solid state image sensor is selected to be a multiple of the periodicity of the photosensitive picture elements, and a blurred image is obtained. This type of filter, however, suffers from the drawback that, instead of producing a tightly controlled pattern over a few photosensitive elements, it spreads light over many interference fringes (orders) theoretically out to infinity. In addition, it is difficult to control the energy distribution in the fringes in order to obtain an acceptable blur function covering a designated number of pixels. Moreover, the energy distribution is dependent upon wavelength.

As can be appreciated from the foregoing remarks, there is a need in the art for a physically small blur filter that is inexpensive and relatively simple to manufacture, yet producing a tightly controlled blur pattern that is not dependent upon polarization techniques. As an alternative to the birefringent blur filter and the phase diffraction grating, U.S. Pat. No. 4,989,959 discloses a pyramidal structure comprised of four wedges which divide incident light into four quadrants so that light from the same image point impinges, on the average, on several photosensitive elements in the image sensing device. A concern with such a pyramidal filter is the manufacturing process, which would be required to produce four abutting facets at identical angles on a single piece of material. One facet would ordinarily be machined or ground into a single piece of material, the piece would then be cut into sections, and the sections glued together to form a piece shaped like a pyramid. This is a difficult process to execute with the needed precision. While there are optical benefits in using a pyramidal blur filter as compared to other blur filters known in the prior art, the manufacture thereof remains a complicated and costly process.

SUMMARY OF THE INVENTION

The aforementioned problems are solved by an imaging apparatus that generates an image signal from incident image light, and has its higher spatial frequencies limited by a fiber optic blur filter to reduce undersampling artifacts. The apparatus includes an image sensor for generating the image signal from an array of photosites, and an array of optical fibers interposed in the path of the incident image light such that at least some of the optical fibers emit light over adjacent photosites so as to substantially blur the image, thereby producing a blurred image upon the sensor with limited higher spatial frequency content.

The advantages of using an optical fiber blur filter according to the invention include simpler and less complicated manufacture, and a tightly controlled blur pattern that is independent of wavelength or of the polarization state of incident image light, as well as of the focal length of the optical system. A camera system employing this filter, therefore, can be used with popular polarizing filters. In addition, the small size of the filter insures that it will fit within compact apparatus, particularly when the blur filter is used as a protective cover plate for the sensor.

BRIEF DESCRIPTION OF THE DRAWINGS

The invention will be described in relation to the drawings, wherein.

DESCRIPTION OF THE PREFERRED EMBODIMENTS

Since electronic imaging apparatus, particularly electronic cameras using solid state sensors, are well known, the present description will be directed in particular to elements forming part of, or cooperating more directly with, apparatus in accordance with the present invention. Elements or techniques not specifically shown or described herein may be selected from those known in the art. For instance, geometrical relationships of the optical components are not shown or described in detail, except where necessary to describe the invention. Moreover, since bundled arrays of optical fibers are commonly available, well-known structures, the appropriate manufacturing, assembly, and packaging techniques, as well as the specifications of useful fiber materials, are well known in the art and will not be further addressed herein.

Figure 1:
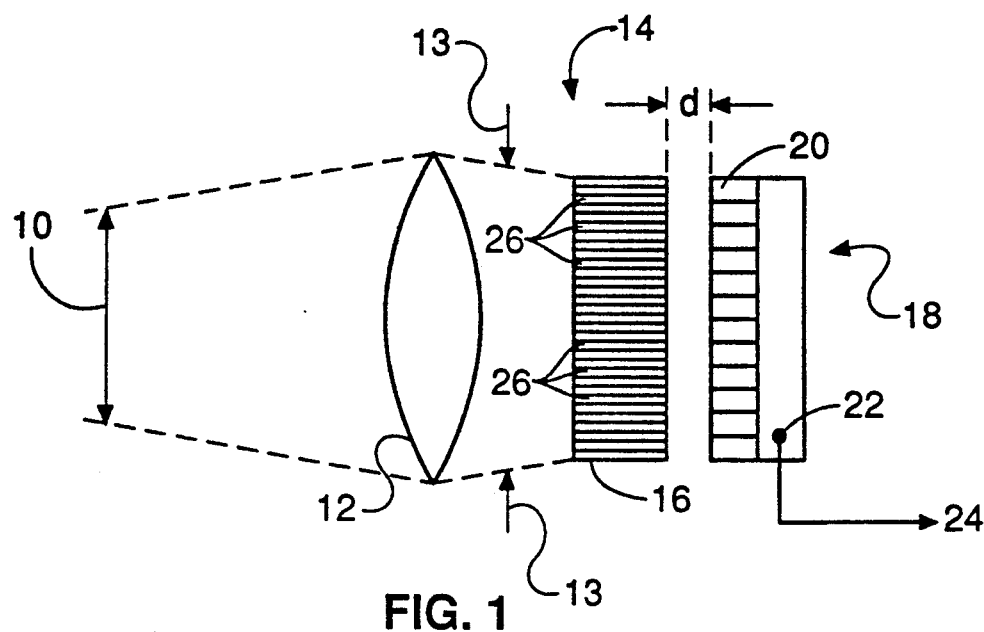
FIG. 1 is an illustration of imaging apparatus utilizing an optical fiber array as a blur filter in accordance with the invention.

Since the figures respectively show several embodiments of the invention, the same reference character will be used wherever possible to refer to the same component. In each embodiment (although not always shown), an image of an object 10 is generated by a lens 12 and focused through a diaphragm 13 (shown schematically by arrows) upon imaging apparatus 14, which senses a blurred version of the image. Referring to FIG. 1, an optical fiber array 16 is shown for use in the imaging apparatus 14 to transmit the image between the lens 12 and an image sensor 18. Importantly, the optical fiber array 16 functions in the imaging apparatus as a blur filter for blocking higher spatial frequencies from reaching the sensor 18. The image sensor 18 is comprised of a two-dimensional array of photosites 20 and an output section 22 for outputting an image signal 24. The optical fiber array 16 includes a two-dimensional structure of optical fibers 26 interposed along an optical axis in the path of image light, and separated by a distance d from the image sensor 18. As better shown in partial cross-section in FIG. 2, each fiber 26 is surrounded by a sheath of cladding 28, and bound with the other fibers into a fixed orientation. That is, the fibers 26 are carefully arranged so that their terminations occupy the same relative positions in both of the bound ends of the bundle. Such a bundle of fibers is said to be coherent, and is capable of transmitting images. Thus, in the imaging apparatus 14 of FIG. 1, image data obtained from areas (pixels) of the object 10 is coherently transmitted to the sensor 18. Ordinarily, the fiber optic array 16 will be a fused, rigid plate separated from the sensor 18, as shown by FIG. 1, by the spacing d.

Each fiber 26 collects light at its input face 30 over a range of angles $\beta$, and internally reflects the collected light to its output face 32. Given the case where an image is focused on the optical fiber array 16, each fiber 26 will collect the light from one pixel of the image. All sub-pixel detail information is lost as the light is conveyed along the fiber. The light emitted from the output face 32 of each fiber 26 is substantially uniform in intensity with high frequency spatial content less than the fiber's dimension having been lost by the integrating nature of the fiber. In this way, the effect of low pass filtering is obtained. The collection angle $\beta$ is a function of the actual aperture value set by the diaphragm 13, with the collection angle $\beta$ becoming smaller for smaller aperture values. The maximum value of the collection angle $\beta$ is also dependent upon an aperture value, referred to as the numerical aperture, established by the fiber itself.

Figure 2:
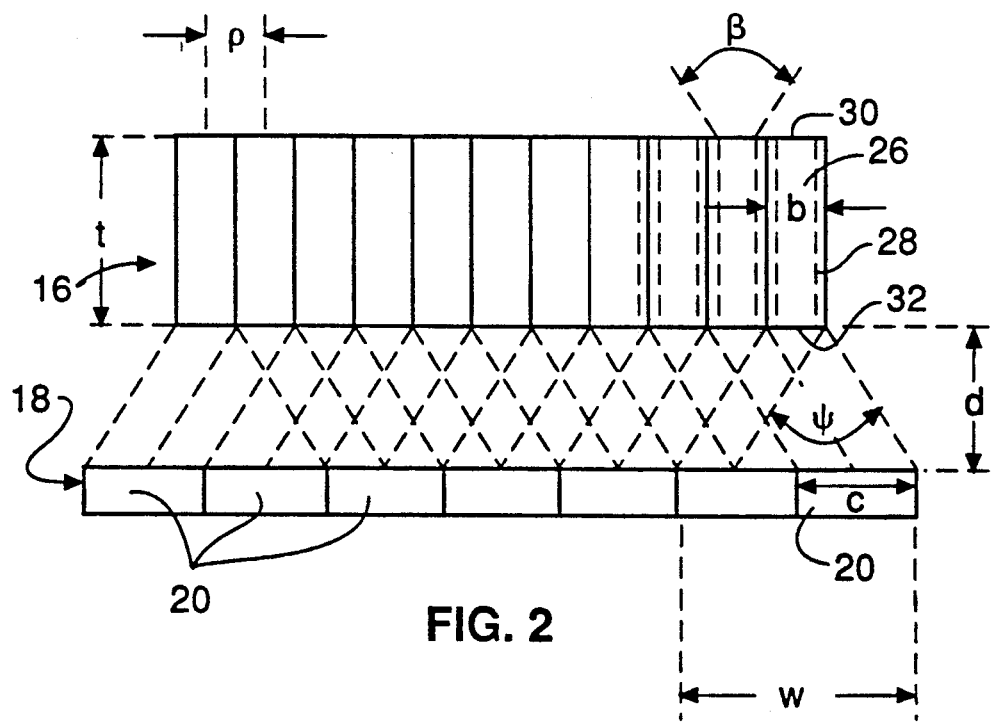
FIG. 2 is an enlarged view of the arrangement of FIG. 1, showing the relationship between the fibers and the photosites.
Figure 3:
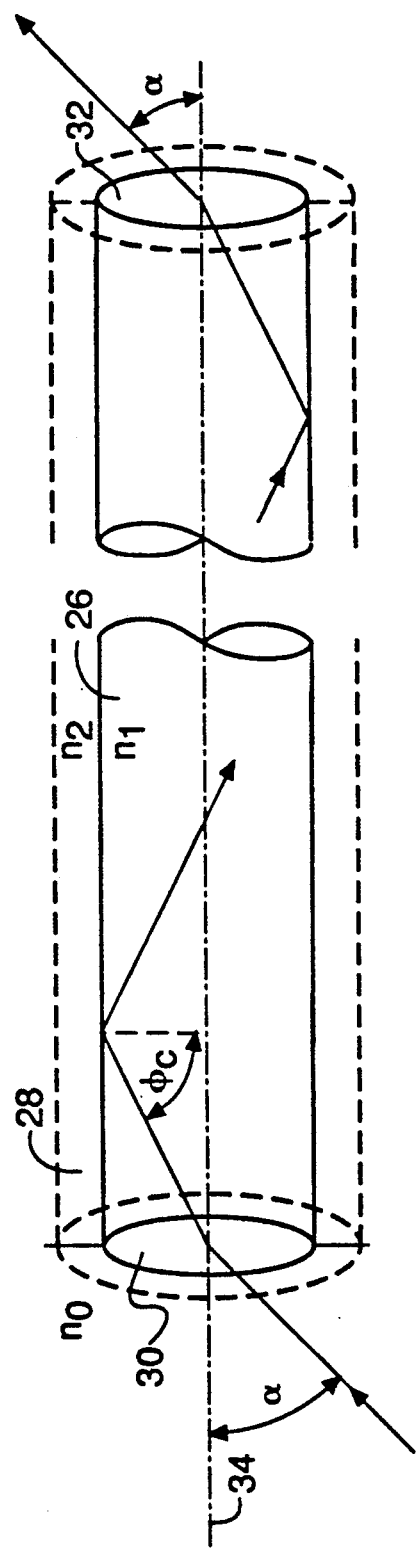
FIG. 3 is a ray path diagram through an optical fiber, which is useful in explaining the invention.

To understand this, consider the case as shown in FIG. 3 of a straight cylindrical fiber 26 with a refractive index $n_1$ embedded in (or clad with) a medium 28 of refractive index $n_2$, where $n_1 > n_2$. A ray of light passing through the fiber axis 34 from a medium of refractive index $n_0$ is incident onto the perpendicular input face 30 of the fiber at an angle $\alpha$. This ray will be refracted at the input face 30 and will be totally reflected at the fiber wall if its angle of incidence against the fiber wall is greater than the critical angle $\phi_c$. This ray will be transmitted through the fiber 26 by internal reflection until it is again refracted by the perpendicular output face 32, and exits the fiber at the same angle $\alpha$ at which it entered. Accordingly, the angle $\alpha$ defines the half-angle of the cone of light output by the fiber, i.e., twice the angle $\alpha$ is the cone angle as the term is used herein, which is the output angle $\Psi$ shown in FIG. 2. The maximum value $\alpha_m$ for which the ray will be totally reflected can be derived from Snell's law and simple trigonometry, and leads to the following relationship:

$$n_0 \sin \alpha_m = (n_1^2 - n_2^2)^{\frac{1}{2}} \quad (1)$$

By analogy with lens optics, the term $n_0 \sin \alpha_m$ is called the numerical aperture and is a measure of the light gathering power of the fiber. Rays incident on the face 30 at greater than $\alpha_m$ will strike the fiber wall at angles less than $\phi_c$. Such rays will not be totally internally reflected and will quickly leak out of the fiber 26. As appreciated from the structure shown in FIG. 1, such rays could leak into adjoining fibers and eventually cause flare at the output of the array 16.

From an inspection of equation (1) it may be appreciated that the respective indices $n_1$ and $n_2$ of refraction for the fiber and cladding may be chosen ($n_1$ sufficiently larger than $n_2$) so as to force the sin $\alpha_m$ to equal one. For air at the input, (i.e., $n_0 \approx 1$), this means that the largest numerical aperture equals one. Therefore, if the refractive indices of the core and cladding are sufficiently different that $$n_1^2 > n_2^2 + 1 \qquad (2)$$

light at all incident angles is transmitted through the fiber (except for small losses due to Fresnel reflection at input and output faces, and for rays approaching at grazing angles to the input face). In this case, the angle $\alpha_m$ equals 90° and the fiber totally internally reflects substantially all light entering its face 30. In practical use of the imaging apparatus 14, the collection angle $\beta$ is less than the maximum collection angle($2\alpha_m$) because the actual aperture value is restricted to the cone angle $\Psi$ by the diaphragm 13.

Figure 4:
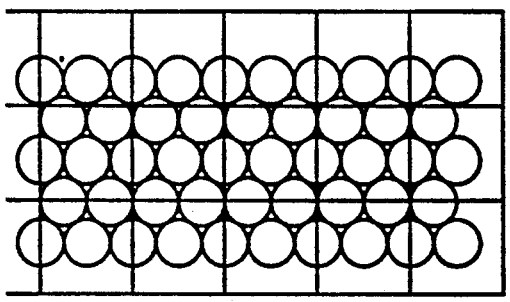
FIG. 4 is an end view of the optical fiber array of FIG. 1 superimposed over the photosites of the sensor.

Referring again to FIG. 2, the pitch p of the optical fiber array 16 is selected such that the cross section b of each fiber 26 is less than the cross section c of each photosensitive element 20. This is done to insure that the full resolution of the image sensor 18 is obtained. For example, fibers with a fiber pitch equal to the pitch of the photosensitive elements compromise the resolution of the image sensor 18 because of the hexagonal packing pattern shown in FIG. 4 prevents accurate alignment of the fibers with the photosites. Consequently, as shown in FIGS. 2 and 4, fibers are used that are smaller in cross section than the photosites. As also shown in FIG. 2, the optical fiber array 16 is spaced a small distance d from the sensor 18 so that the cone angle $\Psi$ of the emitted light from each fiber 26 covers a substantial proportion of at least two photosensitive elements 20. Thus, in addition to the integrating effect of the fiber, the coverage of its cone angle further blurs the image. Since the section shown in FIG. 2 is of one dimension, and the cone angle $\Psi$ occupies a volume, the light emitted by each fiber 26 will ordinarily be a circular blur pattern occupying a two-dimensional configuration of photosensitive elements 20, for example, a neighborhood of four adjacent elements 20. This produces a two-dimensional blur pattern useful in eliminating the problem of aliasing due to undersampling.

The optical fiber array 16 shown in FIG. 2 is a thin structure, having a thickness t on the order of a fraction of a millimeter, e.g. about 500 microns. The only requirement is that incoming light can reflect from the fiber walls a multiplicity of times so as to achieve an integrating effect. The separation distance d between the sensor 18 and the optical fiber array 16 depends upon the diameter b of the fibers, the cross section c of the photosites, and the amount of blur desired (i.e., the width w of the blur pattern, see FIG. 2). It is expected that the distance d would typically be a few tens of microns for typical values of the other parameters.

Figure 5:
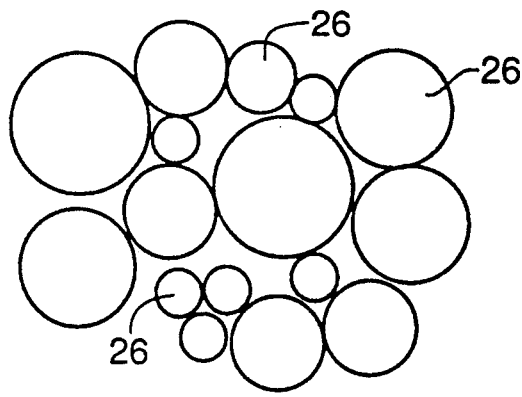
FIG. 5 is an end view of a second embodiment of the optical fiber array, showing a pseudo-random array of fibers having multiple diameters.
Figure 6:
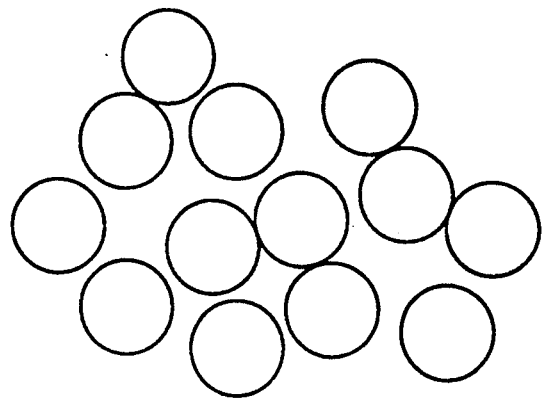
FIG. 6 is an end view of a third embodiment of the optical fiber array, showing a pseudo-random array of randomly packed fibers.

FIGS. 5 and 6 show two embodiments of a disordered optical fiber array wherein the fibers 26 are arranged in a pseudo-random pattern with respect to the fiber diameter or the packing orientation, respectively. The array of FIG. 5 limits the appearance of aliasing by utilizing a pattern related to the human eye. The human eye also samples images, but aliasing is prevented due to the fact that the rods and cones are randomly distributed on the retina rather than arranged in an orderly array. Although aliasing does occur, the high frequency content is aliased into a band of lower sub-Nyquist frequencies. This is less noticeable than aliasing to a single spatial frequency.

From an inspection of FIG. 5, it can be seen that the optical fiber array 16 is composed of fibers 26 of several diameters. When the image is focused onto the surface of the array 16, the image is sampled in a pseudo-random fashion due to the variation in fiber diameters. The light is conveyed to the output faces of the fibers 26 where it exits and is imaged upon the sensor 18 (as shown generally in FIG. 1). High frequency content is aliased down into sub-Nyquist bands as described above in connection with the human retina, producing an effective anti-aliasing filter. Moreover, the spacing between the sensor 18 and the optical fiber array 16 produces additional blurring of the image since the cone angle of the emitted light from at least some of the fibers 26 span multiple adjacent photosites 20 in the sensor 18. In this way, subsampling artifacts between the photosite pitch and the fiber pitch is avoided. As an alternative to using fibers of varying diameter, fibers of a uniform diameter may be used if the fiber pitch is varied as shown in FIG. 6 to achieve the desired randomness.

Figure 7:
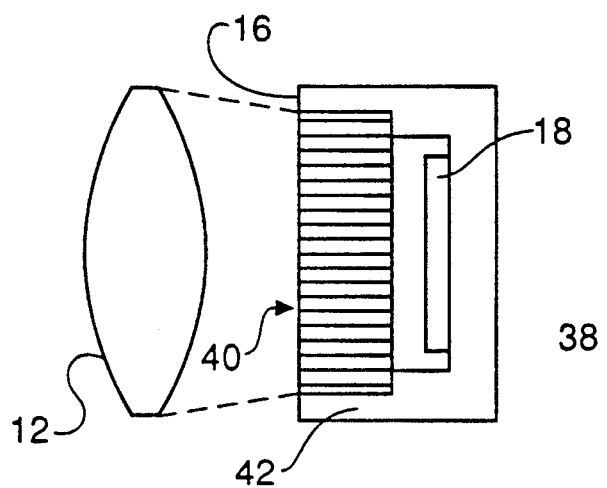
FIG. 7 is a further embodiment of imaging apparatus in accordance with the invention, in which the optical fiber bundle is used as a cover glass for the sensor as well as a blurring filter.

FIG. 7 shows an additional embodiment in which the image sensor 18 is packaged into an assembly including a sensor carrier 38 that is environmentally sealed by a cover plate 40. The image sensor 18 is typically packaged in a plastic or ceramic carrier 38 and covered by an optically transparent cover glass 40. The image sensor 18, which is surrounded by the carrier 38 and the cover glass 40, is then protected from environmental dust and moisture. In the previous embodiments, though not specifically set forth, the image sensor 18 could be protected by a cover glass either between the optical fiber array 16 and the sensor, or on top of them. At each glass surface, however, there is an approximate 4% reflection loss which lowers the sensitivity of the imaging apparatus and may lead to image flare. In the embodiment of FIG. 7 these problems are avoided by using the optical fiber array 16 as the transparent cover glass 40. The carrier 38 is forwardly extended into a shoulder edge 42 that defines an opening toward incident image light. The array 16 seats into the shoulder edge 42 to provide an environmental seal. Since only two glass surfaces are now involved, reflection losses are reduced and packaging is simplified. The optical fiber array 16 is in near contact with the image sensor 18 and is typically only a fraction of a millimeter thick. Thus the imager package can be quite thin for systems where space is at a premium.

The use of an optical fiber array in accordance with the previous embodiments provides a number of advantages, as follows. A near ideal optical low pass filter function is achieved since all spatial frequencies above one-half the fiber-optic pitch (the Nyquist rate of the fiber) are eliminated. Unlike a birefringement filter, a two-dimensional blur spot is obtained with one device (instead of with two birefringent plates). Moreover, the low pass filter function is independent of optical wavelength, polarization, and lens focal length.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifica-

PARTS LIST

- 10 OBJECT
- 12 LENS
- 13 DIAPHRAGM
- 14 IMAGING APPARATUS
- 16 OPTICAL FIBER ARRAY
- 18 IMAGE SENSOR
- 20 PHOTOSITES
- 22 OUTPUT SECTION
- 24 IMAGE SIGNAL
- 26 OPTICAL FIBERS
- 28 CLADDING
- 30 INPUT FACE
- 32 OUTPUT FACE
- 34 OPTICAL AXIS
- 38 SENSOR CARRIER
- 40 COVER GLASS
- 42 SHOULDER EDGE

What is claimed is:

1. An imaging apparatus for generating an image signal from incident image light having its higher spatial frequencies limited to reduce undersampling artifacts, said apparatus comprising:
   an image sensor for generating the image signal from an array of photosites; and
   an array of optical fibers interposed in the path of the incident image light such that at least some of the optical fibers emit light over adjacent photosites so as to substantially blur the image upon said sensor.

2. An imaging apparatus as claimed in claim 1 wherein said array of optical fibers is disposed a predetermined distance from said sensor so that at least some of said optical fibers provide a cone of light that substantially covers at least two adjacent photosites.

3. An imaging apparatus as claimed in claim 1 wherein at least some of said optical fibers provide a cone of light that covers a two-dimensional configuration of photosites.

4. An imaging apparatus as claimed in claim 1 wherein said optical fibers are smaller in cross section than the photosites.

5. An imaging apparatus as claimed in claim 1 wherein said optical fibers have a plurality of different diameters.

6. An imaging apparatus as claimed in claim 1 wherein said optical fibers are packed together in an ordered array.

7. An imaging apparatus as claimed in claim 1 wherein said optical fibers are packed together in a disordered array.

8. An imaging apparatus as claimed in claim 1 wherein said optical fiber array functions both as an optical low pass filter and as a cover glass for environmentally protecting said sensor.

9. An imaging apparatus for generating an image signal from incident image light having its higher spatial frequencies limited to reduce undersampling artifacts, said apparatus comprising:
   an image sensor for generating the image signal from a two-dimensional array of photosites, each having a particular cross section; and
   an array of optical fibers each having a cross section that is less than the particular cross section of said photosites, said array interposed in the path of the incident image light relative to said sensor such that each optical fiber emits a cone of light that covers a substantial proportion of a two-dimensional configuration of photosites so as to output a blurred image upon said sensor.

10. An imaging apparatus as claimed in claim 9 wherein said array of optical fibers is disposed at a sufficient distance from said sensor that the cone of light spreads over the configuration of photosites.

11. An imaging apparatus as claimed in claim 10 wherein a lens is used to direct the image light upon the optical fiber array.

12. An imaging apparatus as claimed in claim 9 wherein said optical fibers are disposed in an ordered pattern in said array.

13. An imaging apparatus as claimed in claim 9 wherein said optical fibers are disposed in a disordered pattern in said array.

14. An imaging apparatus for generating an image signal from incident image light having its higher spatial frequencies limited to reduce undersampling artifacts, said apparatus comprising:
   an image sensor for generating the image signal from an area array of photosites; and
   a fiber optic array composed of a pseudo-random array of optical fibers interposed in the path of the incident image light a predetermined distance from said sensor such that a substantial proportion of the optical fibers emit cones of light that substantially cover at least two photosites so as to output a blurred image upon said sensor.

15. An imaging apparatus as claimed in claim 14 wherein said pseudo-random array of optical fibers includes fibers with a plurality of different diameters.

16. An imaging apparatus as claimed in claim 14 wherein said pseudo-random array of optical fibers includes fibers that are variably packed into the array so as to have a variety of fiber pitches.

17. An imaging device for generating an image signal from incident image light, said device comprising:
   an image sensor for generating the image signal from an array of photosites;
   a sensor carrier having an opening in one direction for receiving image light, said carrier supporting said image sensor therein in such orientation that the photosites receive image light through the opening; and
   a transparent protective glass element covering the opening in said sensor carrier, said glass element comprising an array of optical fibers.

18. An imaging device as claimed in claim 17 wherein said array of optical fibers is separated from said image sensor by a distance sufficient to output a blurred image upon said sensor and thereby reduce undersampling artifacts in the image signal.

* * * * *